INVENTOR.
ROBERT W. WHEELER

INVENTOR.
ROBERT W. WHEELER
BY Chisholm and Spencer
ATTORNEYS

INVENTOR.
ROBERT W. WHEELER
BY Chistodn and Spencer
ATTORNEYS

March 19, 1968  R. W. WHEELER  3,374,080
GLASS SHEET PRESS BENDING APPARATUS WITH
CONVEYING ROLLER RECESSES
Filed Nov. 18, 1964  5 Sheets-Sheet 4

INVENTOR.
ROBERT W. WHEELER
BY Christolm & Spencer
ATTORNEYS

March 19, 1968 R. W. WHEELER 3,374,080
GLASS SHEET PRESS BENDING APPARATUS WITH
CONVEYING ROLLER RECESSES
Filed Nov. 18, 1964 5 Sheets-Sheet 5
FIG. 5
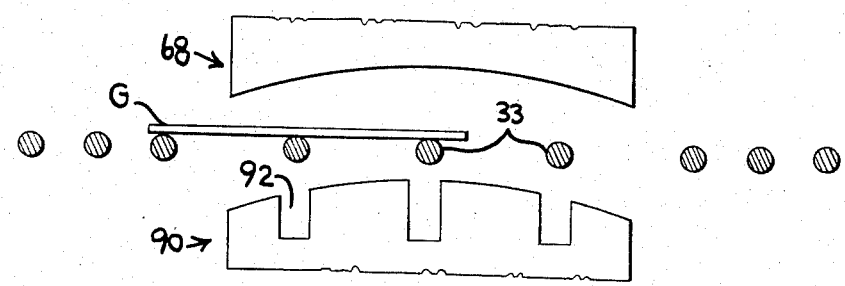
FIG. 6
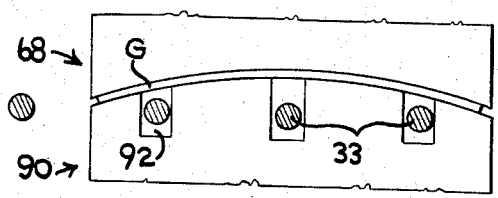
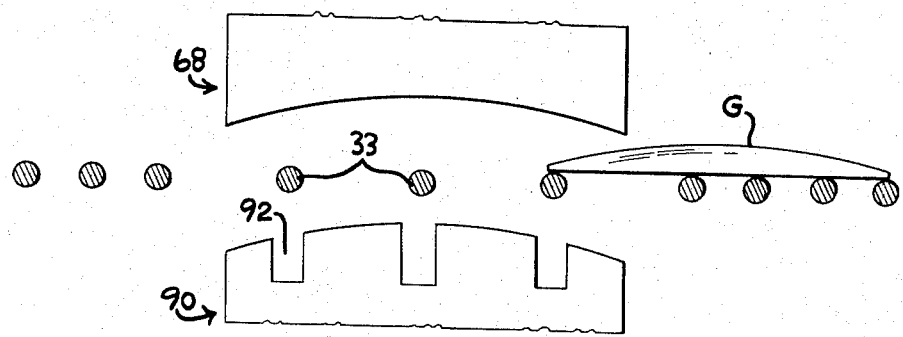
FIG. 7
INVENTOR.
ROBERT W. WHEELER
BY Chisholm and Spencer
ATTORNEYS

3,374,080
GLASS SHEET PRESS BENDING APPARATUS WITH CONVEYING ROLLER RECESSES
Robert W. Wheeler, Pittsburgh, Pa., assignor to Pittsburgh Plate Glass Company, Pittsburgh, Pa., a corporation of Pennsylvania
Filed Nov. 18, 1964, Ser. No. 412,084
3 Claims. (Cl. 65—273)

ABSTRACT OF THE DISCLOSURE

Apparatus for shaping glass sheets conveyed horizontally on a roller conveyor between upper and lower glass shaping members having complementary shaping surfaces. The lower shaping member has a substantially continuous shaping surface except for a small portion thereof notched to provide clearance for movement between a retracted position below the conveyor and a glass engaging position above the conveyor and is preferably convex in elevation. The glass engaging areas of the shaping members are preferably, but not necessarily, within 25 percent of one another.

---

The present invention relates to producing curved glass sheets, and more particularly to a new and improved method and apparatus for bending glass sheets.

Curved glass sheets have become popular recently as sidelights as well as windshields and backlights of modern automobiles. Another use for curved glass has been as a protection for the face of television tubes. In the latter application of curved glass plates, it is necessary that the protective plates be shaped to conform exactly to the curvature of the outer face of the television tube so as to facilitate laminating its inner surface to the outer surface of the television tube.

The present invention provides apparatus that supports and conveys a succession of glass sheets in a horizontal position along a horizontal path of movement that intersects successively a heating zone, a bending zone, and a cooling zone.

In the heating zone, heating elements are arranged to radiate heat toward the path traversed by the glass sheets to heat the latter to an elevated temperature at which the glass can be shaped in a matter of one or two seconds by pressurized contact between complementary shaping members while plastic. This temperautre is usually above the so-called deformation temperature wherein a glass sheet sags between spaced supports by gravity. For commercial plate, sheet, or float glass of soda-lime silica composition, the deformation temperature is upwards of 1080 degrees Fahrenheit.

In the bending zone, glass shaping apparatus is provided comprising upper and lower glass shaping members having substantially continuous shaping surfaces. The glass shaping members have complementary shaping surfaces of concave and convex configuration conforming to the shape desired for the upper and lower surfaces of the glass sheets. The glass shaping members are disposed above and below one another. Actuating means is provided to interrupt the movement of a glass sheet and for moving the lower glass shaping member vertically between a lower position spaced from the upper glass shaping member and below the horizontal plane of movement of the glass sheet and a raised position above said horizontal plane. In the raised position, the heated glass sheet is engaged in pressurized contact throughout substantially its entire upper and lower major surfaces between the glass shaping members.

In cases where the bent glass sheets are required to be heat strengthened, a cooling zone comprising upper and lower plenum chambers having orifices facing the opposite surfaces of the bent glass is provided. Fluid is imparted under pressure through the orifices toward the opposite glass surfaces. The cooling zone is located down stream of the bending zone along the path of movement. The present invention uses a roller-type conveyor to provide the horizontal path of movement for the glass sheets.

In shaping glass sheets, it is critical that the glass sheets be bent to extremely close tolerances. Superior results are obtained when substantially the entire extent of both surfaces of the glass are engaged in pressurized contact between a pair of glass shaping members. When only one surface is contacted throughout its extent and the other surface contacted around its margin only, heat is withdrawn at different rates from the opposite surfaces of the glass. Thus, when the glass subsequently cools to an equalized temperature, it is distorted in shape. When a glass sheet is bent between complementary glass shaping members of skeleton outline, it is difficult to control the shape of the glass within the outline that is engaged in pressurized contact.

Having both the upper and lower shaping member of substantially solid construction so as to apply pressurized contact throughout the upper and lower surface of the glass permits equal withdrawal of heat from both major surfaces of the glass sheet as it undergoes shaping. This substantially equal heat withdrawal from the glass sheet surfaces during bending is sufficient to cause the surfaces to be rigid during the time that the sheet is transferred to a cooling station. Thus, the sheet is sufficiently soft to be deformed rapidly when it arrives at the shaping station and is sufficiently hard to be transferred from the shaping station to the cooling station without distortion.

Another factor that provides benefits from the present invention is that the botom shaping member is convex in elevation. As the glass is shaped at the shaping station, its lower sufrace inside its marginal portion is lifted out of contact with the conveyor rolls that transport the sheets from the bending or shaping station to the cooling station. Only the marginal edge of the glass remains in contact with the rolls. This minimizes any distortion that might occur by virtue of the successive contact of the major surface of the glass with successive rolls along the length of the conveyor.

When the glass is supported along its marginal portions as it traverses a cooling zone where both upper and lower surfaces are subjected to pressurized air blasts, the glass is supported in a more stable manner than is the case when the glass is bent to a configuration having a concave elevation. In the latter case, the glass is supported on its under curved surface and tends to rock about the supported area as it is transferred from roll to roll in the cooling zone.

Prior art glass shaping apparatus comprising an outline shaping member that engages the margin only of one surface of the glass sheet in combination with a solid member that engages the entire other surface of a glass sheet had to bend the glass to a shape different from the ultimate shape desired and to depend upon warpage of the glass as it cooled and distortion resulting from gravity sagging of the glass from the time the shaping members released the glass from pressurized contact until the cooling continued to a temperature at which the glass was below a temperature at which further deformation took place. Control of warpage was difficult to maintain. This difficulty increases as the amount of warpage inherent in the system increases as it does with more complicated bends.

The present invention minimizes the need for depending upon warpake to finalize the shape imparted to the glass.

Another characteristic of the present invention is that the portion of the horizontal conveyor which supports and moves the glass in the vicinity of the glass shaping station comprises a plurality of stub rolls. The lower glass shaping member has a plurality of recesses in its upwardly faced shaping surface of barely sufficient size to permit clearance for upward movement of the lower glass shaping member through the stub rolls and above the horizontal plane of glass support. Thus, the lower glass shaping member contacts almost the entire area of the glass sheet except for the glass sheet portion that is in contact with the stub rolls while the glass shaping members are out of supporting contact with the glass. The upper glass shaping member contacts the entire upper glass sheet surface and the lower glass shaping member contacts more than 75 percent of the bottom glass sheet surface during its pressurized shaping.

The present invention is employed most efficiently when it is used in conjunction with an invention of James H. Cypher, described and claimed in a copending application, Ser. No. 412,083, filed on the same day as the present application. In the Cypher invention, the glass shaping members are held in pressurized engagement against the opposite surface of the glass sheet after shaping the glass to its desired shape for a period sufficient to withdraw enough heat from the opposing glass sheet surfaces to harden the surfaces and cause the glass to be sufficiently rigid so that it is not distorted when supported for movement into the cooling area. The fact that substantially equal areas of the upper and lower surfaces are in contact for substantially equal times during this extended period of pressurized contact causes the glass to cool while shaped to its ultimate configuration. Therefore, the glass will not be distorted through gravity sagging and/or thermal distortion as the glass temperature approaches uniformity throughout its extent during the short interval that the glass is transferred to the cooling station where the glass is strengthened by forced cooling.

The present invention will be further understood from the description of a particular embodiment thereof which follows. It is understood, however, that many variations may be made without departing from the spirit of the claimed invention which is recited in the claimed subject matter which follows the specification.

In the drawings which form part of the description of the specific illustrative embodiment and wherein like reference numbers refer to like structural elements, FIG. 1 is a fragmentary longitudinal elevation partly in section of a glass shaping station built in accordance with the present invention and shown in an assembly containing a heating furnace and a cooling station;

Figure 1:
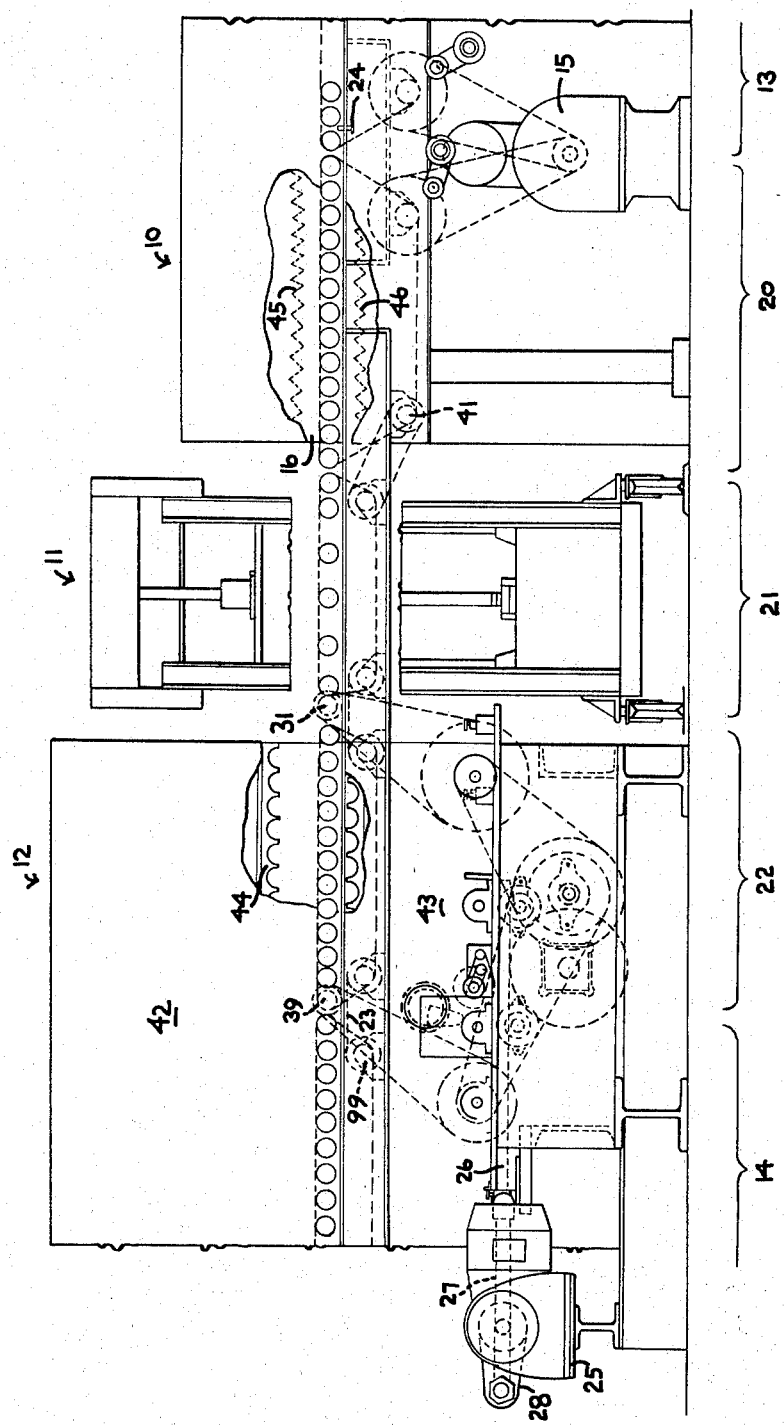

FIGS. 5, 6, and 7 are schematic views showing the glass sheet as it enters the shaping station (FIG. 5), as it is shaped (FIG. 6), and as it leaves the shaping station after being shaped (FIG. 7).

The apparatus to be described as an illustrative embodiment of the present invention is suitable for production of bent glass sheets on a mass-production operation. In the operation to be described, sheets of glass are moved successively in spaced relation, one after another, along a definite horizontal path through a heating zone 10, a bending zone 11, and a cooling zone 12. A conveyor system extends horizontally to provide a horizontal path through the three zones to convey glass sheets supported in a horizontal plane therethrough.

The conveyor system comprises a first conveyor section 13 and a last conveyor section 14 driven at a predetermined speed. A drive motor 15 drives the first conveyor section 13 through a series of connecting chain drives. A similar motor (not shown) operates the last conveyor section 14 in a similar manner.

The first conveyor section 13 extends from a loading station (not shown) through the major portion of the length of a tunnel-like furnace which comprises the heating zone 10. The tunnel extends longitudinally of the conveyor system from the loading station (not shown) to an exit slot 16 through which heated glass sheets are transferred by means of a first transfer section 20 from the heating zone 10 to the bending zone 11. Normally, motor 15 also drives the first transfer section 20 at the speed of the first conveyor section 13.

The portion of the conveyor that traverses the bending zone 11 is termed the shaping or bending conveyor section 21. The latter portion of the conveyor is located beyond the first transfer section 20. A second transfer section 22 extends from the bending zone 11 to the cooling zone 12 and interconnects the space between the bending conveyor section 21 and the final conveyor section 14. Normally, the motor which drives the last conveyor section 14 also drives the second transfer section 22 at the same speed through a chain drive 23.

A glass sensing device 24 is located toward the end of the first conveyor section 13. The latter operates through an adjustable time delay circuit (not shown) to actuate a motor 25. The latter moves a rack 26 through a driving link 27 which is pivotally connected to one end of the rack and in turn pivotally connected to the radially outer end of a motor driven cam 28. A drive shaft 29 is rotatably responsive to movement of rack 26 to drive a pulley and jack shaft arrangement 30 which drives an overrunning clutch 31. The latter is selectively coupled to a driving roll 32 for the bending conveyor section 21.

The rolls for all the conveyor sections except for the middle three rolls 33 of the bending section 21 extend transversely continuously from their opposite ends which are supported on journal housings carried by channel members 34 and 35 extending along the opposite longitudinal side edges of the entire conveyor system. Rolls 33 are stub rolls extending inward from channel members 34 and 35 but having the inner ends thereof spaced from one another to provide clearance for upward movement of a lower glass shaping member to be described in greater detail subsequently.

All the rolls in the conveyor system are 1 inch diameter stainless steel shafts extending horizontaly transversely of the conveyor and are spaced longitudinally along the conveyor path. All the rolls except the stub rolls 33 are mounted on 3 inch centers. The stub rolls are spaced 6 inches lengthwise of the conveyor from one another and from the adjacent full rolls.

The rack 26 is also coupled through drive shaft 29, chain drive 36, jack shaft 37, chain drive 38, and a second overrunning clutch 39 to a drive shaft 40 for the second transfer section 22. Rack 26 is movable into positions to actuate limit switches LS–1 and LS–2. The latter control various phases of the bending cycle as will be noted in FIGS. 1 and 2.

Rack 26 also drives the rolls of the first transfer section 20 through an overrunning clutch 41 and a chain drive connection to the bending conveyor section 21.

Most of the rolls of the second transfer section 22 and the final conveyor section 14 extend between an upper plenum 42 and a lower plenum 43. Each of the plenums is supplied with a series of orifices 44 extending through the walls facing the conveyor system. Thus, air under pressure is supplied through apertures 44 to accelerate the cooling rate of sheets conveyed between the plenums as is conventional in glass cooling apparatus.

The conveyor system is normally operated with motor 15 operating the rolls of the first conveyor section 13 and first transfer section 20 and the similar motor (not shown) driving the rolls of the second transfer section 22 and of the last conveyor section 14 at a given speed. Normally the first transfer section 20 and the second transfer section 22 are tied in to operate respectively with the first and last conveyor sections 13 and 14. When the leading edge of a glass sheet passes over the glass sensing device 24, a time delay circuit is actuated. At the end of a predetermined time delay set for the time delay circuit, motor 25 is actuated to move rack 26 through the cam 28 and link 27 arrangement so that rack 26 moves first at an increasing and then a decreasing speed. During the forward movement of the rack, the clutches 31, 39, and 41 are simultaneously engaged and cause the rolls in the first and second transfer sections 20 and 22 and those in the bending section 21 to rotate at a relatively fast speed. The length of relatively rapid movement of the glass sheet is controlled by the length of the rack 26 and the ratio of circumferences of the sprockets interconnecting the various drive chains so that at the extreme end of the movement of rack 26, limit switch LS–1 is actuated to deactive clutches 31, 39, and 41. The glass comes to rest in alignment with the shaping members to be described later. The rolls in the second transfer section 22 again rotate in unison with the rolls of the last conveyor section 14 while those in the first transfer section 20 again rotate in unison with the rolls of the first conveyor section 13. When the rack 26 actuates limit switch LS–2 on its return to starting position, the motor 25 is deactivated and the operation reset for the succeeding cycle.

Actuation of limit switch LS–1 also begins the operation of the press bending apparatus which will be described subsequently.

The heating zone 10 comprises a furnace of tunnel-like configuration that has upper heating elements 45 and lower heating elements 46 arranged in sets to face the path of travel taken by the glass to irradiate the upper and lower surfaces of the glass sheets that are conveyed along the first conveyor section 13 and part of the first transfer section 20.

The glass shaping apparatus located at the bending zone 11 comprises a frame forming an upper bracket 48 and a lower bracket 50 interconnected by vertical members 52 and diagonal bracing members 54 and 56. Upper bracket 48 supports an air cylinder 58 having a piston movable vertically therein. The piston has a piston rod 60 extending downward therefrom and terminating in a pivoted connection 62 to a bracket 64 attached to a backing plate 66 for the upper glass shaping member 68. The upper shaping member 68 has a downward facing shaping surface that is concave in elevation and conforms to the shape desired for the upper surface of the glass sheet to be shaped.

In order to avoid marring the glass sheet during pressurized engagement, the shaping surface of the upper glass shaping member 68 is provided with a cover 70 of a material that is heat resistant and nonabrasive to glass. A particularly good material for this purpose is knit fiber glass cloth. The material covers the entire shaping surface and extends upwards from the perimeter of the shaping surface to the rear of the backing plate 66 to which it is clamped by a suitable set of clamps (not shown).

Flanking the upper cylinder 58 are a pair of vertical shafts 72 externally threaded on their lower ends for adjustment relative to a pair of internally threaded shaft support members 74 rigidly attached to the backing plate 66. The upper end of each shaft 72 is rigidly secured to a bell-shaped boss 76. Each boss 76 moves with its associated shaft 72 between a lower position where the bosses 76 rest on horizontal flanges 78 forming part of upper bracket 48.

The air above the piston in cylinder 58 serves as a hydraulic cushion against upward movement of the upper shaping member 68 when upward force is applied thereagainst by upward movement of a lower shaping member 90 described below.

Supported on the lower bracket 50 is a lower air cylinder 80 having an upwardly extending piston rod making a pivotal connection 84 with a bracket 86 mounted to the rear of a backing plate 88 for the lower shaping member 90.

The lower shaping member 90 has an upwardly facing surface of convex elevation that is complementary to the downwardly facing concave shaping surface of the upper shaping member 68. The lower shaping member has a knit fiber glass cover similar to that of the upper shaping member.

The lower shaping member 90 differs from the upper shaping member 68 in the provision of a plurality of notches 92 barely sufficient in size to provide clearance for movement of the lower glass shaping member 90 in an upward direction from a position below the horizontal support provided by the conveyor system to a position above said horizontal plane of support and through the stub rolls 33.

A pair of vertical shafts 94 and other structural elements similar to shafts 72 and their associated structures is provided to balance the direction of movement of the bottom glass shaping member in a manner similar to that provided for the upper glass shaping member 68.

Figure 2:
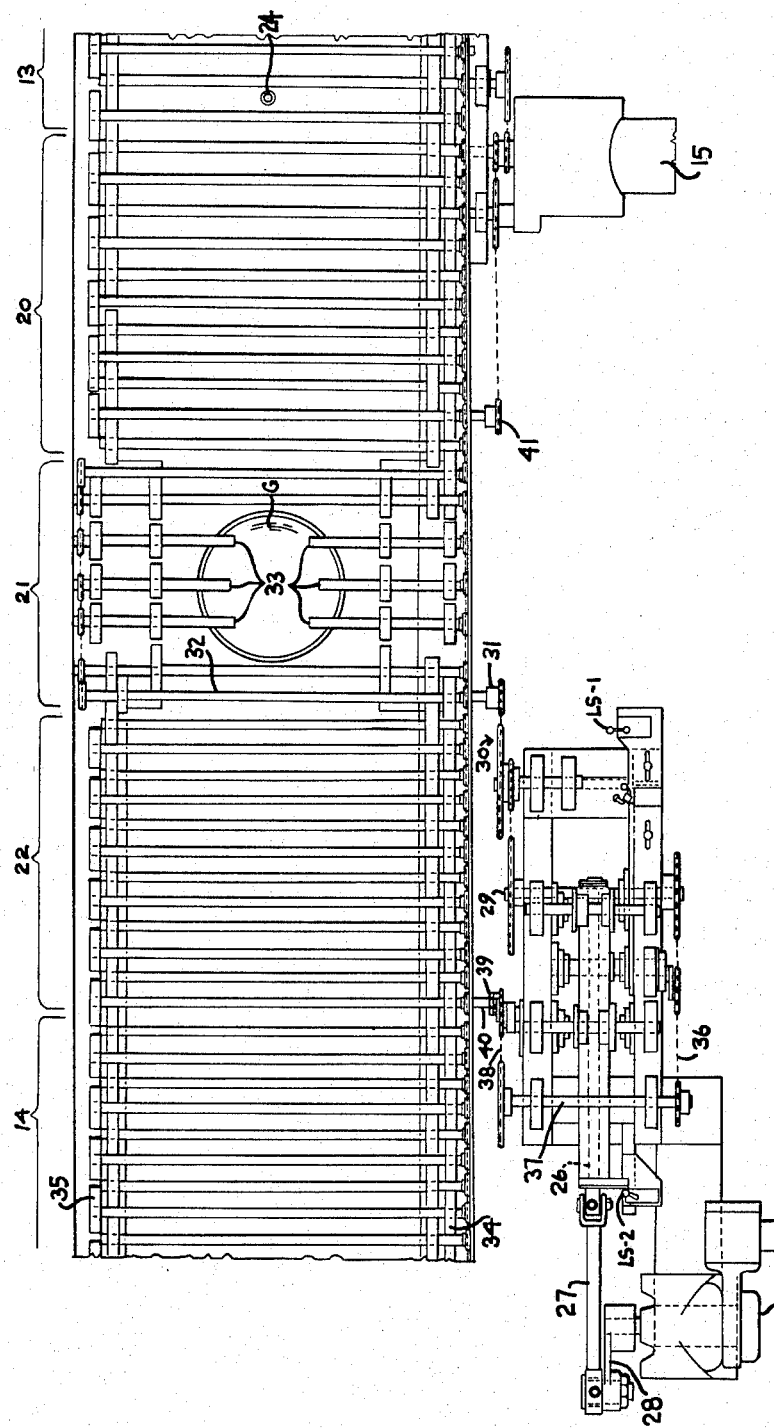
FIG. 2 is a plan view of a portion of the conveyor system for the portion of the apparatus depicted in FIG. 1.
Figure 3:
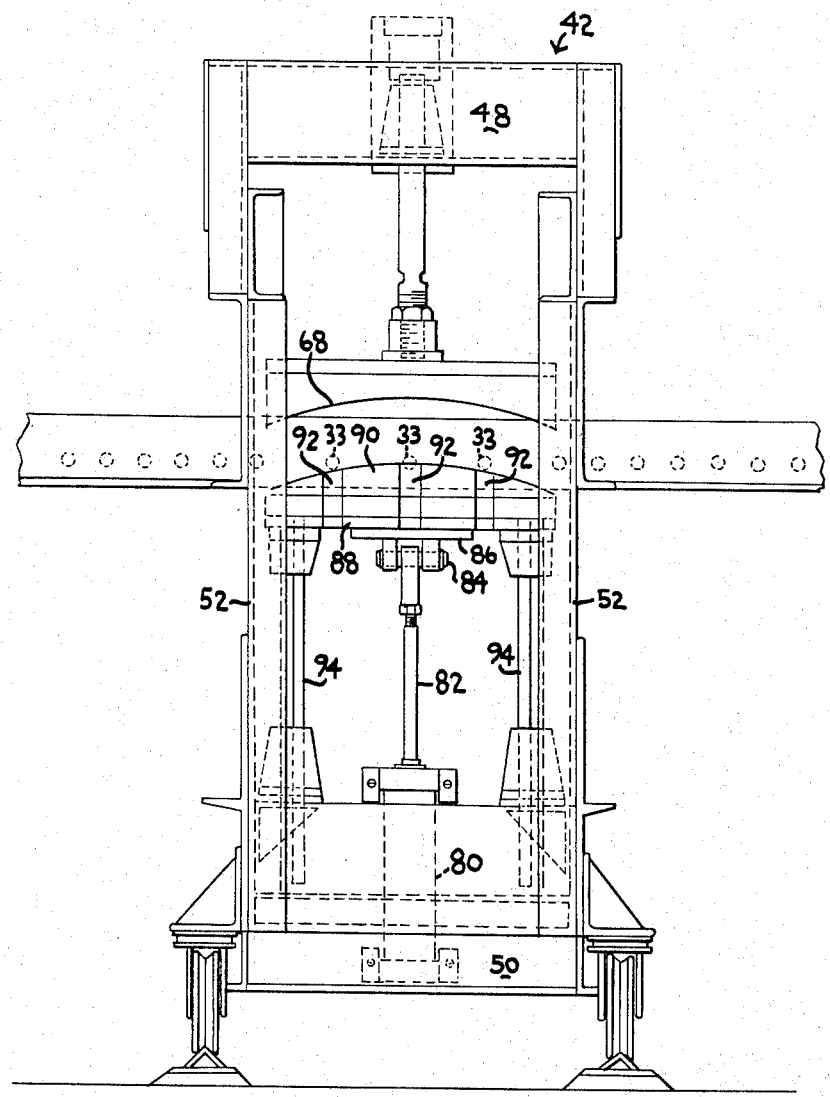
FIG. 3 is an enlarged elevation of the glass shaping apparatus of the present invention.
Figure 4:
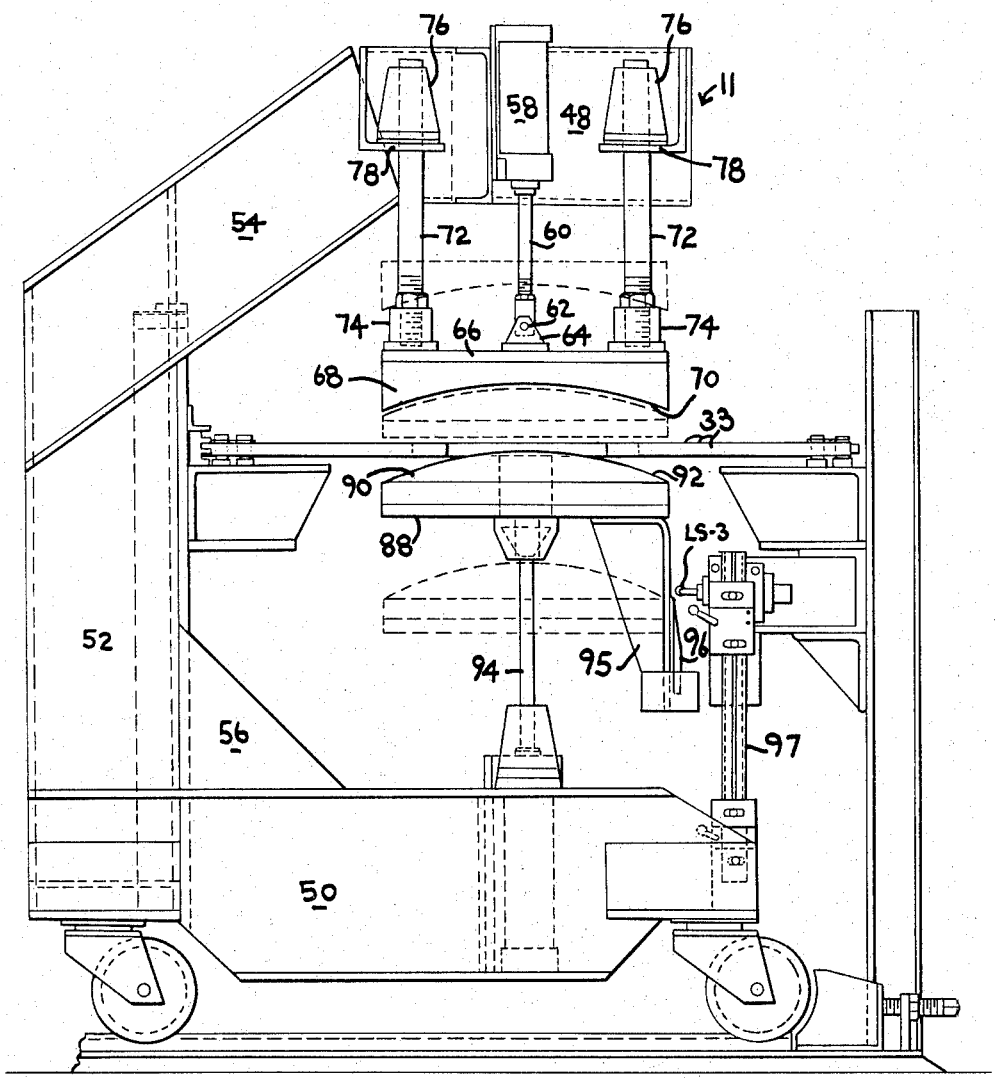
FIG. 4 is a sectional view of the apparatus shown in FIG. 3.

A bracket 95 is attached to the rear of backing plate 88 and has a cam 96 mounted on a downwardly extending bracket wall. Limit switch LS–3 is mounted on a post 97 for actuation by cam 96 when bracket 95 moves upward with the bottom shaping member 90 as the latter moves with piston rod 94 in response to actuation of limit switch LS–1 (FIG. 2).

The bottom shaping member 90 moves upward when a glass sheet has been brought to rest in position on stub rolls 33 between upper shaping member 68 and itself from a position below the stub rolls 33 to a position wherein the recesses 92 encompass the stub rolls and its upper convex shaping surface lifts the glass sheet G off the stub rolls and into pressurized engagement against the downwardly facing shaping surface of concave elevation of the upper shaping member 68. When limit switch LS–3 is engaged by cam 96, it actuates a check valve in the hydraulic system (not shown) to decelerate the speed of upward movement of the bottom glass shaping member 90. This deceleration of upward movement and the hydraulic spring action of the air above the piston in the upper cylinder 58 causes the glass sheet, which has been heat-softened in the heating zone 10 to be gradually engaged in pressurized contact between the glass shaping members after being lifted a sufficient distance above the stub rolls 33 to clear the conveyor rolls.

Normally, the last conveyor section 14 drives the second transfer section 22 through chain drive 23 and a slip clutch 99 except when overrunning clutch 39 is engaged and rack 26 moved. This actuation causes the rolls of second transfer section 22 to rotate at a higher speed than normal during the simultaneous transfer of one sheet into bending position and another bent sheet toward the cooling station 12.

The glass is held in pressurized contact between the glass shaping members for sufficient time to shape the glass and also to cool both its upper and lower curved surfaces so that the latter become sufficiently hard to enable the glass sheet, now convex in elevation, to be redeposited upon the stub rolls as the bottom shaping member 90 lowers to its retracted position, and be supported on its marginal edge portion only for transport out of the bending zone 11 and into and through the cooling zone 12 with its undersurface inward of its marginal edge portion out of contact with the rolls by virtue of its convex elevational shape. The hardening of the upper and lower surfaces of the glass is accomplished through heat exchange between the glass shaping members and the glass major surfaces during the duration of pressurized engagement between the shaping members and the glass.

Since the glass surface is hardened and since substantially the entire extent of both the upper and the lower surfaces of the bent glass is engaged by a shaping member, the amount of cooling of the major surfaces by heat exchange is substantially equal. Thus, the glass is not likely to be distorted either thermally or by gravity sagging as it is moved from the bending zone to the cooling zone.

Both the upper and lower glass shaping members are retractable for substituting different shaping members when production requirements dictate a change of pattern. Since this aspect of the apparatus does not form part of the present invention and may be accomplished in several ways well known in the art, it is not being described.

In order to protect the glass sheets from being subject to loss by "chill cracking," the conveyor rolls outside the heating zone 10 are covered with stretched braided fiber glass sleeves having a nominal diameter of 3/4 inch and stretchable to fit snugly over the conveyor roll which it covers.

A typical operation of the illustrative apparatus to shape 21 inch diameter face plates of nominal thickness of 1/8 inch for television tubes will now be described.

Flat glass sheets of the requisite outline and thickness were deposited in spaced relation on the loading end of the horizontal conveyor system and conveyed seriatim through the heating zone 10 for 204 seconds at a constant speed on the first conveyor section 13 and the first transfer section 20 to reach a temperature of 1215 degrees Fahrenheit. During this period, the glass sheet actuated the glass sensing device 24, which actuated motor 25 after a delay of approximately one second. Then, in 2.4 seconds, a sheet was moved at an increasing then decreasing rate along the end of the first transfer section 20 and the bending conveyor section 21 of the conveyor system.

The bending conveyor section 21 was stopped with the glass sheet in alignment with the glass shaping members 68 and 90. In an additional three seconds, the bottom glass shaping member 90 lifted the glass sheet off the stub rolls and brought it into pressurized engagement the bottom surface of the upper glass shaping member 68.

Meanwhile, the rolls of the first transfer section 20 and the second transfer section 22, which were clutched to operate at the relatively high speed of rotation of the rolls in the bending conveyor section 21 when the latter were energized, resumed moving at the relatively lower speed of the rolls of the first and last conveyor sections 13 and 14. This removed the previous glass sheet shaped while the next glass sheet was moving into position to actuate the sensing device 23.

According to the invention claimed in the aforesaid copending application of James H. Cypher, the glass was maintained in pressurized contact between the shaping members for 6 seconds. In 0.8 second, the bottom shaping member 90 was fully retracted. Approximately 0.5 second of this retraction time was needed to lower the upper shaping surface of bottom shaping member 90 entirely below stub rolls 33. The bent glass was redeposited onto the stub rolls in slightly less than 12 seconds from the onset of the cycle initiated when the time delay circuit actuated motor 25. This enabled the apparatus to handle 5 sheets of this thickness per minute or 300 sheets per hour. In the first run, the sheets were separated more than necessary for precautionary reasons. Thus, the first run produced bent glass sheets at a rate of 275 plates per hour.

The time required to hold the glass in pressurized engagement to avoid distortion is a function of the glass composition and thickness. Thus, while a 6 seconds duration was desirable for glass sheets of 1/8 inch thickness, 9 seconds duration performed the same benefit for glass sheets 3/16 inch thick. Hence, the present apparatus is capable of producing as many as 240 plates of 3/16 inch thick glass per hour.

It is important that the notched area in the lower shaping member be as small a portion of the shaping surface as possible. For glass sheets 21 inches in diameter, the lower shaping member has a diameter of 23½ inches and 6 notches extend 4 inches inward and slightly over 1 inch wide to furnish clearance for stub rolls 33. Thus, over 150 square inches of a shaping surface area of 174 square inches is available to contact the glass sheet undersurfcae during shaping. No observable distortion occurred when the difference in amount of surface area of glass sheet engaged by the upper and lower shaping members does not exceed 25 percent.

The form of the present invention shown and described in this disclosure represents an illustrative preferred embodiment thereof. For example, in bending glass to deeper curves, the upper shaping member may be actuated for movement between an upper retracted position and a lower pressure-engaging position to reduce the time needed to provide the clearance required for moving the curved glass sheets out of the glass shaping station after bending. It is understood that various changes may be made without departing from the spirit of the invention as defined in the claimed subject matter which follows.

What is claimed is:

1. Apparatus for bending glass sheets comprising a horizontal conveyor comprising spaced rolls for supporting a glass sheet in a horizontal plane and for moving said sheet along a path of movement intersecting successively a heating zone and a bending zone, said bending zone comprising upper and lower glass shaping members having substantially continuous complementary shaping surfaces conforming to the shape desired for substantially the entire extent of the upper and lower surfaces of said glass sheets and disposed above and below one another, actuating means attached to said lower glass shaping member for moving the latter vertically between a lowered position spaced from said upper glass shaping member and below said horizontal plane to permit a glass sheet to move in said horizontal plane in said bending zone and a raised position above said horizontal plane wherein said glass sheet is directly engaged in pressurized contact between said glass shaping members, and roll clearance means forming less than 25 percent of the sheet engaging area of said lower shaping member to permit said movement to said raised position, wherein said horizontal conveyor comprises a plurality of stub rolls in said bending zone, and said clearance means for said lower glass shaping member comprises a plurality of marginal recesses in its upwardly facing shaping surface of barely sufficient size to permit clearance for upward movement of said lower glass shaping member above said horizontal plane.

2. Apparatus as in claim 1, wherein said upper glass shaping member has a downwardly facing shaping surface of continuously concave elevation and said lower glass shaping member has an upwardly facing shaping surface of continuously convex elevation.

3. In apparatus for shaping glass sheets wherein a heat-softened glass sheet is bent to a desired configuration by being pressed between upper and lower shaping members while supported horizontally, the improvement comprising a lower shaping member having a continuous, upwardly facing shaping surface of continuously convex configuration conforming to the shape desired for substantially the entire extent of the lower major surface of said heat-softened glass sheet, a plurality of stub rolls for supporting said heat-softened glass at spaced areas in its marginal portion only, a notch extending inward from a margin of said lower shaping member and aligned with each of said stub rolls and barely large enough to provide clearance for said stub rolls, said notches forming less than 25 percent of the sheet engaging area of said lower shaping member, and means for displacing said lower shaping member from a position below said stub rolls to a position wherein its continuous shaping surface is entirely above said stub rolls.

References Cited

UNITED STATES PATENTS

| | | | |
|---|---|---|---|
| 3,265,484 | 8/1966 | Ritter | 65—104 |
| 3,294,516 | 12/1966 | Carson et al. | 65—275 |

FOREIGN PATENTS 1,375,949  10/1964  France.

DONALL H. SYLVESTER, *Primary Examiner.*

A. D. KELLOGG, *Assistant Examiner.*